United States Patent
Kremliakova

(10) Patent No.: US 9,040,210 B2
(45) Date of Patent: May 26, 2015

(54) STABLE, DURABLE CARBON SUPPORTED CATALYST COMPOSITION FOR FUEL CELL

(71) Applicants: Daimler AG, Stuttgart (DE); Ford Motor Company, Dearborn, MI (US)

(72) Inventor: Natalia Kremliakova, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 232 days.

(21) Appl. No.: 13/711,786

(22) Filed: Dec. 12, 2012

(65) Prior Publication Data

US 2013/0164655 A1 Jun. 27, 2013

Related U.S. Application Data

(60) Provisional application No. 61/579,953, filed on Dec. 23, 2011.

(51) Int. Cl.
*H01M 4/92* (2006.01)
*H01M 4/88* (2006.01)

(52) U.S. Cl.
CPC .............. *H01M 4/921* (2013.01); *H01M 4/925* (2013.01); *H01M 4/8825* (2013.01); *Y02E 60/50* (2013.01); *H01M 4/926* (2013.01)

(58) Field of Classification Search
None
See application file for complete search history.

(56) References Cited

U.S. PATENT DOCUMENTS

| 8,097,045 | B2 | 1/2012 | Marquais-Bienewald et al. |
| 2005/0112451 | A1 | 5/2005 | Lee et al. |
| 2007/0231674 | A1* | 10/2007 | Shelnutt et al. ................. 429/44 |
| 2009/0041935 | A1 | 2/2009 | Yamazaki et al. |
| 2010/0068591 | A1* | 3/2010 | Kawamura ..................... 429/30 |
| 2010/0190086 | A1* | 7/2010 | Harkness et al. ............. 429/483 |
| 2011/0151354 | A1 | 6/2011 | Jin et al. |

FOREIGN PATENT DOCUMENTS

| WO | 2009090125 A1 | 7/2009 |
| WO | 2011038907 A2 | 4/2011 |
| WO | WO 2011038907 A2 * | 4/2011 |

OTHER PUBLICATIONS

Cruz Quinones, Miguel, "Characterization of ordered intermetallics as catalysts for fuel cell applications", Department of Chemistry, San Juan, P.R.—University of Puerto Rico at Rio Piedras, Mentor: Jamie L. Cohen and Prof. Hector D. Abruna, Department of Chemistry & Chemical Biology, Cornell University, Ithaca, NY, 2005.

(Continued)

*Primary Examiner* — Ula C Ruddock
*Assistant Examiner* — Scott J Chmielecki
(74) *Attorney, Agent, or Firm* — Patent Central LLC; Stephan A. Pendorf

(57) ABSTRACT

A carbon supported catalyst composition for solid polymer electrolyte fuel cells is disclosed that shows a high mass activity and favorable stability and durability. The catalyst composition comprises an intermetallic phase or alloy comprising Pt and a metal selected from the group consisting of Nb, Ta, V and Mo, and comprises an oxide of the metal. The carbon supported catalyst composition can be prepared at relatively low temperature either by first depositing and heating an oxide precursor of the metal on a suitable carbon to make a hybrid support, and then depositing and heating a Pt precursor on the hybrid support, or by depositing both an oxide precursor of the metal and a Pt precursor on a suitable carbon support, and directly heating to a final temperature.

4 Claims, 12 Drawing Sheets

(56) References Cited

OTHER PUBLICATIONS

Papageorgopoulos et al., "The inclusion of Mo, Nb and Ta in Pt and PtRu carbon supported 3electrocatalysts in the quest for improved CO tolerant PEMFC anodes", ECN Clean Fossil Fuels, P.O. Box 1, 1755 ZG, Petten, The Netherlands, Electrochimica Acta 48 (2002) 197-204.

Hu, Jenny E. et al., "CO tolerance of nano-architectured Pt-Mo anode alectrocatalysts for PEM fuel cells", International Journal of Hydrogen Energy (2012), doi:10.1016/j.ijhydene.2012.04.094, Department of Mechanical Engineering, University of Maryland, College Park, MD 20742, USA, Elsevier, International Journal of Hydrogen Energy XXX (2012) 1-8.

* cited by examiner

US 9,040,210 B2

STABLE, DURABLE CARBON SUPPORTED CATALYST COMPOSITION FOR FUEL CELL

BACKGROUND

1. Field of the Invention

The present invention pertains to carbon supported catalyst compositions for fuel cells that are characterized by good stability, durability, and high activity. In particular, it relates to carbon supported catalyst compositions for use in solid polymer electrolyte fuel cells and to methods for making same.

2. Description of the Related Art

Solid polymer electrolyte fuel cells convert reactants, namely fuel (such as hydrogen) and oxidant (such as oxygen or air), to generate electric power. Such fuel cells generally employ a proton conducting polymer membrane electrolyte between two electrodes, namely a cathode and an anode. A structure comprising a proton conducting polymer membrane sandwiched between two electrodes is known as a membrane electrode assembly (MEA). Each electrode in a MEA comprises an appropriate catalyst composition and optionally a fluid diffusion layer that are arranged such that the catalyst composition is located between the polymer membrane and the fluid diffusion layer. Commonly, the catalyst compositions comprise a noble metal catalyst (e.g. Pt) that is supported on a high surface area support (e.g. activated carbon) in order to obtain high electrochemical activity. For gaseous reactants, the fluid diffusion layer is known as a gas diffusion layer and is typically made of porous carbonaceous material (e.g. carbon fiber paper). The gas diffusion layer serves to distribute reactants to and by-products from the catalyst composition, as well as to provide mechanical support and electrical connection to the catalyst composition. MEA stability and durability, and particularly that of the catalyst compositions, are some of the most important issues for the development of fuel cell systems in either stationary or transportation applications. For automotive applications for instance, an MEA may be required to demonstrate durability of about 6,000 hours. However during fuel cell operation, the platinum in conventional catalyst compositions can dissolve, re-deposit in the membrane, and agglomerate, resulting in electrochemical surface area losses, and an associated decrease in catalyst activity. And in supported catalyst compositions, there can be stability issues associated with either the catalyst or the support or both. For instance, corrosion of the carbon support is a known concern in carbon supported Pt catalyst compositions. The fuel cell industry, especially the automotive fuel cell industry, demands active and stable cathode catalysts.

Significant research into catalysts for such fuel cells has been ongoing. For example, Miguel Cruz Quinones at the Cornell Center for Materials Research (*Characterization of ordered intermetallics as catalysts for fuel cell Applications*, 2005) investigated new intermetallic compounds for fuel cell anodes using cyclic voltammetry. Among the most promising ordered intermetallic phases were $Pt_3Ta$, $Pt_2Ta$, $Pt_3Ti$ and $Pt_3Nb$.

D. C Papageorgopoulos et al. investigated the inclusion of Mo, Nb and Ta in Pt and PtRu carbon supported electrocatalysts in the quest for improved CO tolerant anodes for solid polymer electrolyte fuel cells (Electrochimica Acta 48 (2002) 197-204). Here, the noble metals were present in highly dispersed form but without being alloyed to each other.

Others have also investigated improved catalysts for fuel cell electrodes. In WO2009/090125, an improved electrode catalyst was disclosed comprising platinum or platinum alloy and a metal oxide such as tantalum oxide and/or niobium oxide. In US2010068591, fuel cell electrodes comprising $Nb_2O_5$/Pt/C catalyst were disclosed.

While certain Pt alloys show promise for use in fuel cells, it is difficult to form such alloys without using very high synthesis temperatures. But highly dispersed, high surface area catalyst is desired for purposes of providing high activity per unit mass and exposure to high temperatures generally tends to cause Pt catalysts to coalesce with a substantial reduction in surface area and hence activity per unit weight. Recently, in patent application WO2011/038907, catalyst compositions were disclosed comprising intermetallic PtMe on a Nb or Ta oxide support. These compositions showed improved stability and durability over Pt. The compositions were made by heating a Pt compound, an appropriate Nb or Ta salt, and a basic salt at low temperature (e.g. <900° C.). Dispersions and supported catalyst compositions were not prepared.

There remains a continuing need for more stable and durable catalysts for a fuel cell electrode is needed, and especially one that can be easily synthesized. The present invention addresses these and other needs.

SUMMARY

Carbon supported catalyst compositions are disclosed that exhibit the desirably high mass activity expected of a highly dispersed catalyst while also showing improved stability and durability under typical fuel cell operating conditions. The catalyst composition comprises an intermetallic phase or alloy comprising Pt and a metal selected from the group consisting of Nb, Ta, V or Mo. The catalyst composition also comprises an oxide of the metal. The presence of such alloys and oxides may be confirmed via high resolution transmission electron microscopy. On the other hand, it may or may not be possible to confirm their presence via basic x-ray diffraction analysis. In an exemplary embodiment, the composition may comprise an intermetallic or alloy of Pt and Nb, and may also comprise $Nb_2O_5$ and/or $NbO_2$. In another embodiment, the composition may comprise an alloy of Pt, Co, and Nb, and may also comprise $Nb_2O_5$ and/or $NbO_2$. The composition comprises a carbon containing support. The carbon in the carbon containing support can be any of the various high surface area carbon materials, such as carbon black, acetylene black, activated charcoal, synthetic graphite, or natural graphite. Such supported catalyst compositions can have mass activities exceeding 200 A/g Pt. The catalyst compositions can be used in either electrode of a fuel cell, and particularly in either electrode of a solid polymer electrolyte fuel cell.

The carbon supported catalyst composition can be prepared at relatively low temperatures by first depositing and heating an oxide precursor of the metal on a suitable carbon at an intermediate temperature to make a hybrid support (i.e. a metal oxide precursor-carbon hybrid support), and then depositing and heating a Pt precursor on the hybrid support at a final temperature. In the method, the final temperature is greater than the intermediate temperature. The whole process can be accomplished at temperatures below about 900° C. In an exemplary embodiment, a $NbO_x$ precursor may first be deposited onto the carbon support and then heated at a intermediate temperature in an inert atmosphere to form a $NbO_x$-carbon hybrid support. Then, a Pt precursor may be deposited on the $NbO_x$-carbon hybrid support, and afterwards heated at a final temperature in a reducing atmosphere to form the carbon supported catalyst composition. In this exemplary embodiment, the carbon supported catalyst composition may appear to be essentially free of any niobium oxide as determined by x-ray diffraction, even though it is present.

Alternatively, the carbon supported catalyst composition can be prepared by depositing both an oxide precursor of the metal and a Pt precursor on a suitable carbon support, and directly heating to a final temperature.

In either of the aforementioned methods for preparing the carbon supported catalyst compositions, other alloying metals, such as Co, can be incorporated into the catalyst composition as desired. This can be accomplished by depositing a Co precursor, along with the Pt precursor, on the metal oxide precursor-carbon hybrid support in the first approach. Or alternatively, this can be accomplished by depositing a Co precursor, along with the Pt precursor, onto the carbon support in the second approach. In this way for instance, catalyst compositions comprising PtCoNb alloy and $Nb_2O_5$ can be prepared on a carbon support.

These and other aspects of the invention are evident upon reference to the attached Figures and following detailed description.

DETAILED DESCRIPTION

Figure 1:
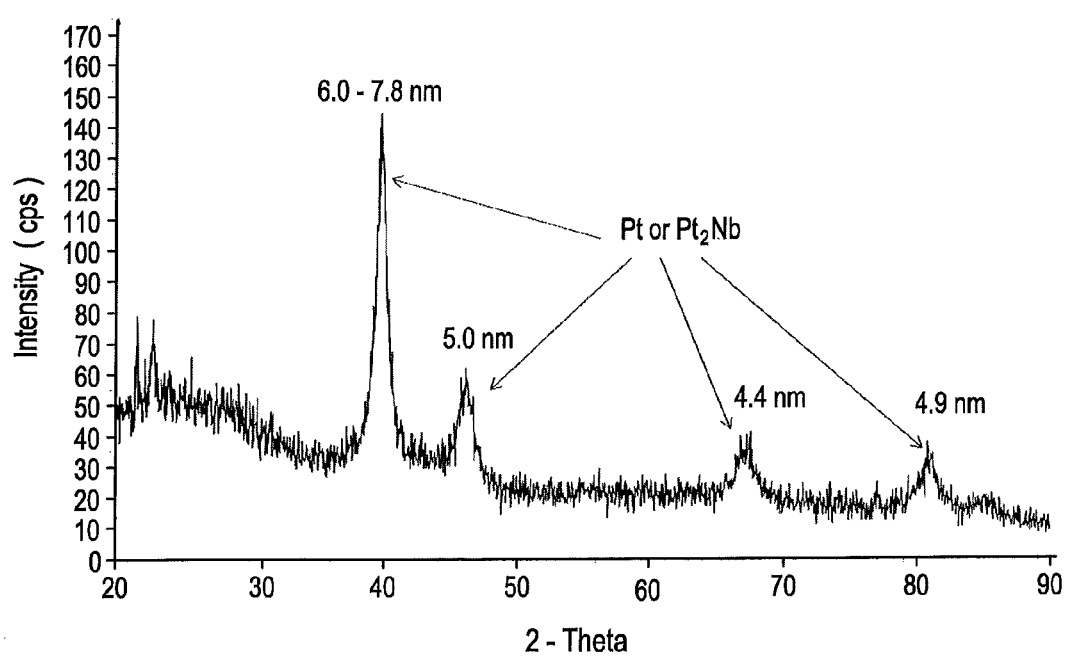
FIG. 1 shows an x-ray diffraction spectrum of the carbon supported catalyst composition of Inventive Example 1.

The supported catalyst compositions of the present invention comprise: an intermetallic or alloy of Pt and either Nb, Ta, V or Mo metal; plus an oxide of the metal; all supported on a carbon based support. The support may additionally comprise other compounds of the metal. The supported catalyst compositions can be synthesized using a simple, relatively low temperature procedure. Other than simplifying the procedure and saving energy, a major benefit of using a lower temperature synthesis method is that it can result in the formation of smaller crystalline regions of the intermetallic or alloy, and hence provide for a high catalytic activity per unit weight. And by alloying the metals, durability is enhanced.

Exemplary catalyst compositions are carbon supported PtNb/Pt and carbon supported PtCoNb/PtCo, which additionally comprise Nb oxides The early transition metals Ta, Va and Mo are chemically similar to Nb and thus are also expected to be capable of forming similar compositions, such as in the Examples below. (Vanadium is not however generally considered suitable in practice in an acidic fuel cell environment because it is not stable therein and is toxic.) The alloying of Pt with dopant metals like Nb, Co, Ta, Zr, Nb, Mo, Y, Ir, etc. can result in certain improvements (durability and/or mass activity) in the resulting catalyst.

A method for making such supported catalyst compositions comprises depositing an oxide precursor of the metal onto a suitable carbon and then heating at an intermediate temperature to make a hybrid support (e.g. less than about 500° C. in order to avoid crystallization of metal oxide). The heating can be done in an inert atmosphere, or alternatively in air. Then, a platinum precursor is deposited on the hybrid support and heated thereafter at a final temperature which is greater than the intermediate temperature (e.g. greater than about 550° C. to provide for crystallization of metal oxide). The heating here is done in a reducing environment, such as a hydrogen/argon mixture. Both heating steps are performed at relatively low temperature, e.g. below about 900° C.

Alternatively, the carbon supported catalyst composition can be prepared by depositing both an oxide precursor of the metal and a Pt precursor on a suitable carbon support, and then directly heating to a final temperature.

In an exemplary embodiment and as illustrated in the Examples below, a $NbO_x$ precursor is deposited onto any of various suitable carbon supports and is then heated in an inert atmosphere to form a $NbO_x$-carbon hybrid support. A heating temperature of about 400° C. may be used here. Then, Pt precursor is deposited on the $NbO_x$-carbon hybrid support. This can be accomplished using conventional techniques known to those skilled in the art. (For instance, it is desirable to use Pt(II) 2,4-pentadionate as a precursor because it provides selective deposition on $NbO_x$.) Afterwards, the $NbO_x$-carbon hybrid support with Pt precursor deposited thereon is heated again in a reducing atmosphere to form a carbon supported $PtNb/Pt/NbO_x$ catalyst composition. A heating temperature of about 800° C. may be used here. Alloying of the Pt and Nb occurs simultaneously with the decomposition of the post deposited Pt precursor on the carbon supported amorphous Nb oxide while under the reducing atmosphere. (Usually Pt precursor decomposition occurs earlier, e.g. between about 200 to 300° C., while PtNb alloying takes place after or simultaneously with $NbO_x$ crystallization.) The type and the size of the final Pt alloyed particles may depend on the properties of the carbon support (e.g. specific surface area) and the Pt/Nb ratio.

Such supported catalyst compositions can desirably be employed in the electrodes of a solid polymer electrolyte fuel cell. Electrodes, MEAs, and the like can be made with these compositions using various conventional construction methods as are known to those skilled in the art.

The catalyst compositions in the supported compositions of the present invention may share some similarities to the unsupported compositions generally disclosed in the aforementioned patent application WO2011/038907. However, without being bound by theory, it appears that there may be certain structural differences between the catalyst alloys actually prepared in each case based on the analytical data obtained to date. Further, the methods used in making the present compositions did not merely involve making an unsupported composition as in WO2011/038907 and then dispersing this on a carbon support. Instead, the present methods involve creating the compositions from precursors deposited on the supports. It therefore appears that both the compositions and the methods for making the present supported compositions may represent unexpected improvements over those specifically shown in the prior art. The successful dispersion of PtNb intermetallics or alloys on high surface area carbon supports provides higher initial mass activity of the synthesized catalyst.

The following examples are illustrative of the invention but should not be construed as limiting in any way.

In the following, several catalyst compositions were prepared and analyzed using various analytical techniques. Powdered sample X-ray diffraction patterns were obtained where indicated and crystallite size was determined by measuring the line broadening of the major diffraction peaks associated with the crystallite pattern (e.g. the {111} peak for Pt) and then calculating crystallite size using the Scherrer equation.

Electrocatalytic evaluation of the prepared compositions was done using a rotating disk electrode technique on sample compositions both before and after prolonged use as a catalyst. Prolonged use here was accomplished by subjecting samples to square wave cycling (SWC). Two test variants (regular and modified SWC) were used in the examples below. The regular SWC test procedure involved cycling numerous times (e.g. 1000 times) repeatedly with cycles comprising a period of 30 seconds at 0.6 V and then 30 seconds at 1.2 V against SHE reference hydrogen electrode. This test is considered to evaluate Pt dissolution and, to some extent carbon corrosion, on a sample composition. The modified SWC procedure is a similar test except that the samples are held for 1 sec at 0.6 V and then 1 sec at 1.0 V against SHE for 30,000 cycles. This test is directed mainly towards testing for Pt dissolution. The duration of both the procedures is the same at about 16.6 hours.

Cyclic voltammograms (CV) were obtained at various cycle numbers during this SWC testing at 100 mV/sec sweep rates from 0.05 to 1.20 volts in 0.1 M $HClO_4$ at 30° C.

In the following, mass activity, in A/g of Pt based on the nominal Pt loading, was determined from ORR curves at 0.9 V. Specifically, kinetic current $I_k$ is calculated using the following equation:

$$I_k = I_m * I_{lim}/(I_{lim} - I_m)$$

where $I_m$ is current measured @ 0.9 V on the ORR curve, and $I_{lim}$ is limiting current taken @ ~0.25 V on the plateau of the ORR curve. Electrocatalytic surface area (ECSA) in $m^2/g$ of Pt was determined from the appropriate CV curves and corresponds to the Pt area of hydrogen desorption from 0.05 to 0.4 V and normalized on Pt content. And specific activity is calculated like kinetic current $I_k$, attributed to ECSA $A/m^2$ of Pt.

EXAMPLES

Inventive Example 1

PtNb Alloy & Nb Oxide on C

A supported Pt alloy catalyst composition was prepared by first depositing $NbO_x$ precursor onto a carbon support, heating, then depositing Pt on the $NbO_x$-carbon hybrid support, and heating again. Specifically, a sol solution of $NbO_x$ was prepared using niobium ethoxide precursor in a mixture of 2-propanol with a strong acid as a catalyst. The $NbO_x$ was then deposited on Cabot@ BP 2000 carbon black using a sol-gel technique. The sample was then heated in an argon atmosphere at 400° C. for 1 hour to produce amorphous $NbO_{2.5}$. An X-ray diffraction (XRD) pattern of the sample was obtained at this point and showed no evidence of a crystalline Nb oxide phase. The stoichiometry of the amorphous Nb oxide was Nb:O of 1:2.5.

The amorphous $NbO_{2.5}$-carbon hybrid obtained was then decorated with 30% Pt by weight using a sol-gel deposition of Pt acetyl acetonate (Pt(II)-2,4-pentadionate). The decorated product obtained was then heated in a hydrogen atmosphere at 800° C. for 1 hour to produce the final supported Pt alloy catalyst composition.

An XRD pattern was again obtained and is shown in FIG. 1. The pattern was characterized by four detectable peaks attributable only to Pt or $Pt_2Nb$, but there was no evidence of any crystalline Nb oxide phase present in the XRD pattern. The apparent size of the crystalline material in the composition was determined from the half-widths of the four peaks in the pattern. These average crystallite sizes are indicated on the respective peaks in FIG. 1 and range from 4.4 nm to about 7.8 nm.

The conductivity of the supported catalyst composition was measured and found to be 0.288 S/cm. The conductivity of the carbon black before preparation was 1.79 S/cm.

The elemental makeup of the supported catalyst composition was determined via energy dispersive X-ray (EDX) and the results are presented in Table 1 below (with element and associated X-ray line measured in the 1$^{st}$ column).

TABLE 1

EDX results for Inventive Example 1

| Element and X-ray line | Average atomic % | σ | Average weight % | σ |
|---|---|---|---|---|
| C K | 74.97 | 1.99 | 37 | 0.96 |
| O K | 12.6 | 0.64 | 8.28 | 0.36 |
| Nb L | 5.78 | 0.09 | 22.04 | 0.15 |
| Pt M | 4.08 | 0.06 | 32.68 | 0.19 |

The data in Table 1 indicates that the Nb/O ratio is lower than 1/2.5. This suggests that not all the Nb is present as $NbO_{2.5}$ and instead suggests that a portion of the Nb present may be alloyed with the Pt, e.g. forming either an alloy or an intermetallic phase with Pt.

The supported catalyst composition was then also analyzed under a high resolution transmission electron microscope (HRTEM). Observations were made over several different locations on a sample and it was discovered that there were several types of regions having different lattice fringe spacings. A value of 0.343 nm was obtained and this is characteristic of the d{220} spacing for a body-centered tetragonal $NbO_2$ crystal. In another region, a value of 0.384 nm was obtained and this is characteristic of the d{001} spacing of 0.39 nm for an orthorhombic $NbO_{2.5}$ crystal. In yet other regions, values of 0.205 nm, 0.222 nm, and 0.237 nm were obtained. These are not characteristic of $NbO_{2.5}$, nor $NbO_2$, nor pure Pt whose most prominent d{111} spacing is 0.23 nm.

Figure 2:
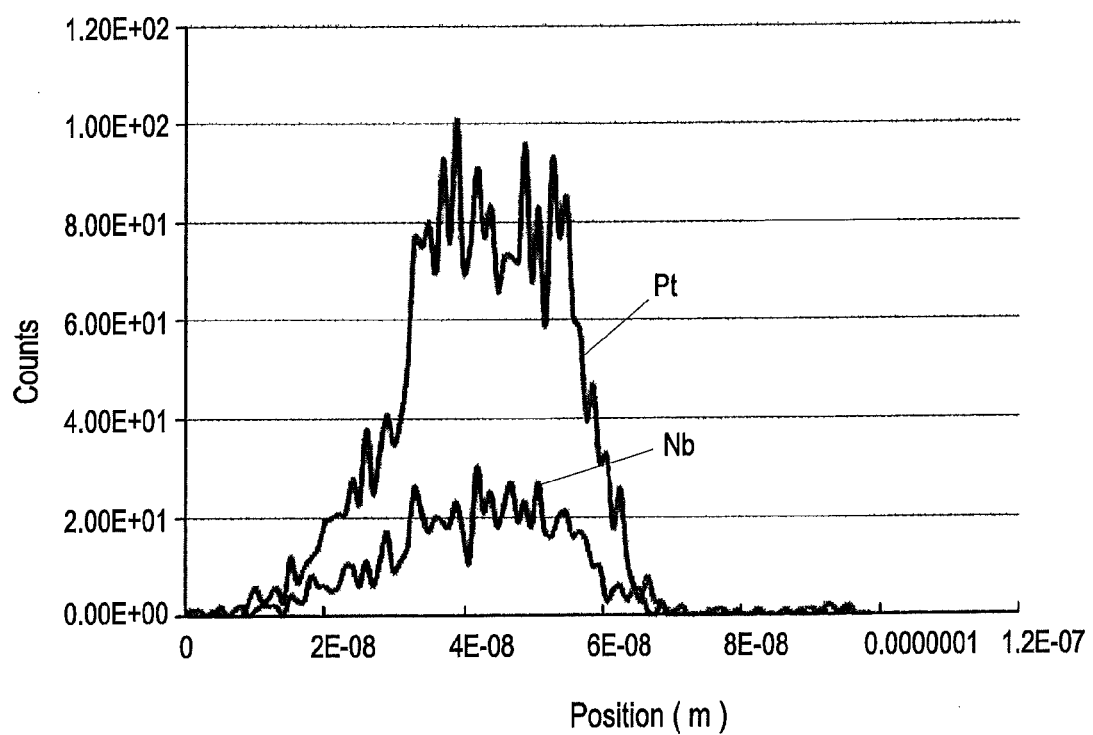
FIG. 2 shows a HRTEM line scan over a single crystal region characterized by lattice fringe spacings of 0.222 nm in the carbon supported catalyst composition of Inventive Example 1.

FIG. 2 shows a HRTEM line scan over what appeared to be a single crystal characterized by lattice fringe spacings of 0.222 nm. (Thus particle was selected for scanning because it was remote from the bulk composition and thus the line scan would not be influenced by neighboring material.) The line scan clearly indicates the presence of both a substantial amount of Pt and of Nb over the line scan dimension of about 40 nm.

It appears therefore that at least a portion of the supported catalyst composition comprises Pt alloyed with Nb so as to form either an intermetallic or a solid solution. Also at least a portion of the supported catalyst composition appears to comprise $NbO_{2.5}$ or $NbO_2$.

The supported catalyst composition was then evaluated electrochemically. The initial mass activity was determined to be ~250 A/g Pt, which is better than many conventional catalysts. This suggests an apparent successful dispersion of the catalyst composition since conventional carbon supported catalysts can be about 150 A/g Pt.

Then, the aforementioned methods were used to determine ECSA and $I_k$ both before and after carrying out square wave cycling. ECSA, $I_k$, and specific activity values were determined initially on samples and then the samples were subjected to regular SWC testing. After numerous SWC cycles, ECSA, $I_k$, and specific activity values were determined again and then SWC testing continued.

Table 2 below summarizes the values of ECSA, $I_k$, and specific activity measured over the course of this SWC testing. The reported values have been normalized to the initial values of the samples (i.e. each has a value of 1 at cycle 0).

TABLE 2

ECSA, $I_k$, and specific activity results for Inventive Example 1

| Regular SWC cycle # | ECSA (normalized) | $I_k$ (normalized) | Specific activity (normalized) |
|---|---|---|---|
| 0 | 1 | 1 | 1 |
| 1320 | 0.73 | 1.52 | 2.07 |
| 2640 | 0.44 | 1.13 | 2.57 |
| 3960 | 0.28 | 0.92 | 3.29 |

Note:
the actual initial ECSA was 32.8 m$^2$/g Pt and the Pt loading was 16.8 μg/cm$^2$.

It is seen from the data in Table 2 that ORR activity $I_k$ actually increases up to the first 1320 cycles while for conventional carbon supported Pt catalysts it usually decreases by 30 to 40% after 1,000 cycles under the same conditions (data not shown). This is in spite of the fact that the carbon support had clearly corroded (as evidenced by the typical quinone peak associated with carbon corrosion appearing on the CV curves). ORR activity $I_k$ remains quite high after up to about 4000 cycles.

Inventive Example 2

PtNb Alloy & Nb Oxide on C

Another supported Pt alloy catalyst composition was prepared in a similar manner to that of Inventive Example 1. This time however, $NbO_x$ precursor was deposited on Darco® G 60 (Norit®) activated charcoal using the sol-gel technique. The sample was then heated in an argon atmosphere at 400° C. for 1 hour to produce an amorphous Nb oxide-carbon hybrid support. No crystalline phase was found in the XRD pattern obtained for this hybrid support.

Figure 3:
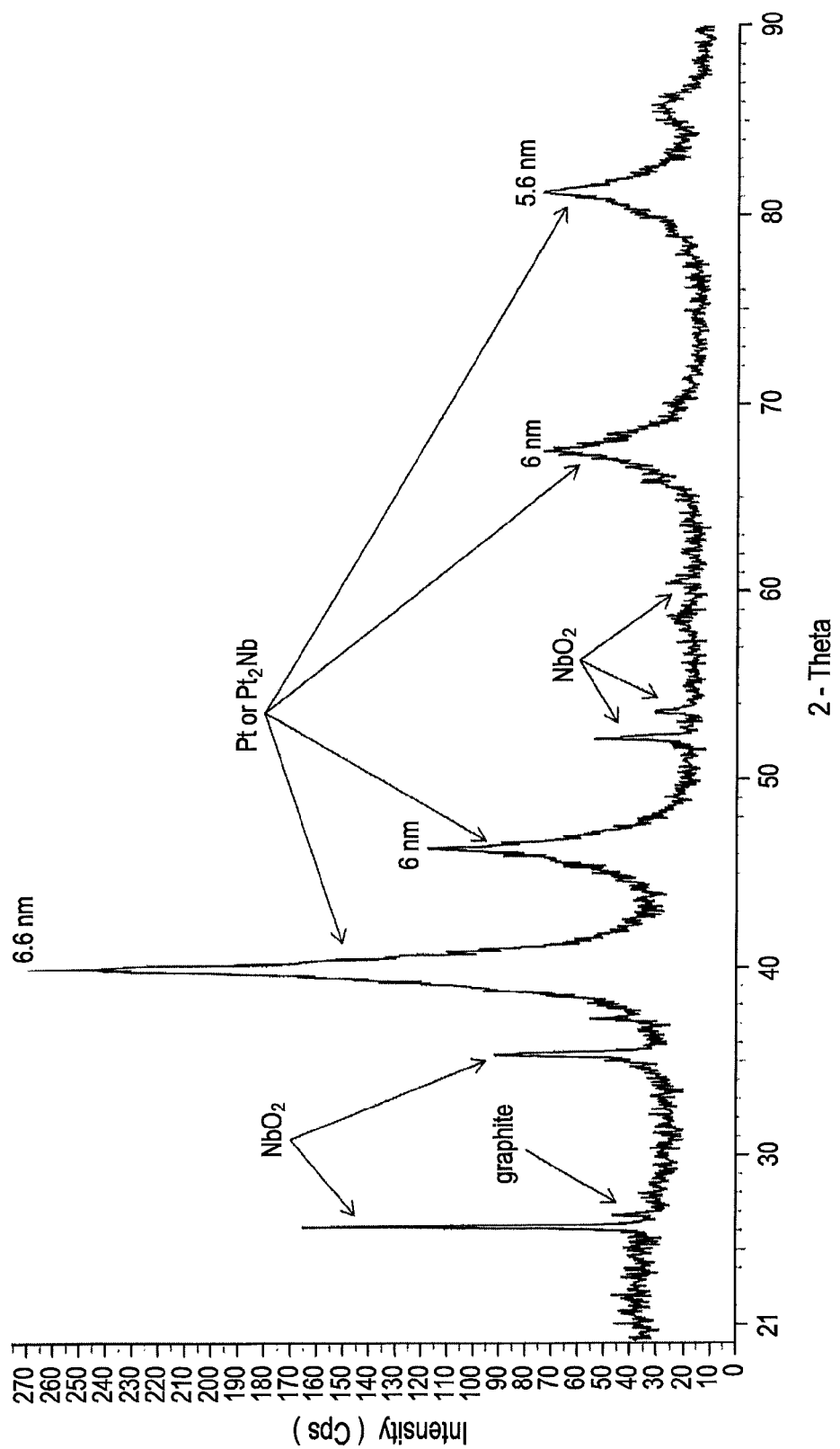
FIG. 3 shows an x-ray diffraction spectrum of the carbon supported catalyst composition of Inventive Example 2.

The Nb oxide-carbon hybrid support was then decorated with Pt and heated in a hydrogen atmosphere as before to produce another supported Pt alloy catalyst composition. An XRD pattern of this product is shown in FIG. 3. In this example, the crystalline phase $NbO_2$ was observed. Otherwise, again the pattern was characterized by four detectable peaks attributable only to Pt or $Pt_2Nb$. The apparent size of this crystalline material in the composition was determined from the half-widths of the four peaks in the pattern. The average crystallite sizes are indicated on the respective peaks in FIG. 3 and range from 5.6 nm to about 6.6 nm.

The conductivity of the supported catalyst composition was measured and found to be 0.454 S/cm. The conductivity of the activated charcoal before preparation was 0.477 S/cm.

The elemental makeup of the supported catalyst composition was again determined by EDX and the results are presented in Table 3 below.

TABLE 3

EDX results for Inventive Example 2

| Element and X-ray line | Average weight % | σ | Average atomic % | σ |
|---|---|---|---|---|
| C K | 43.75 | 0.65 | 85.34 | 0.24 |
| O K | 4.15 | 0.3 | 6.08 | 0.37 |
| Si K | 0.46 | 0.04 | 0.39 | 0.03 |
| Nb L | 15.11 | 0.4 | 3.81 | 0.15 |
| Pt M | 36.53 | 0.55 | 4.39 | 0.13 |

Although the presence of a PtNb intermetallic or alloy could not be unambiguously confirmed from the XRD data, the compositional analysis suggests that some may be present. The average atomic content for oxygen was 6.08% and 0.78% is associated with Si. Thus, only about 5.3% oxygen remains to form $NbO_2$ or can be attributed to functional groups of the activated charcoal. Therefore, only 2.65% or less of the Nb present can be in the oxide state. The rest of the Nb (≥1.16%) was presumably alloyed in some manner with Pt.

The supported catalyst composition was subjected to electrochemical testing. The initial mass activity was determined to be ~240 A/g Pt. Then, ECSA and $I_k$ were measured both before and after carrying out square wave cycling on two different samples subjected to the two different SWC test regimens. In both cases, ECSA and $I_k$ values were determined initially on the samples. In one case, regular SWC cycling was carried out for 1,000 cycles. In the other case, modified SWC cycling was carried out for 30,000 cycles. Table 4 below summarizes the values of ECSA and $I_k$ measured for both tests.

TABLE 4

ECSA and $I_k$ results for Inventive Example 2

| SWC cycle # | ECSA (normalized) | $I_k$ (normalized) |
|---|---|---|
| 0 | 1 | 1 |
| 1000 regular cycles | 0.67 | 0.97 |
| 30000 modified cycles | 0.88 | 1.07 |

Note:
the actual initial ECSA was 74 m$^2$/g Pt.

As is evident from the results in Table 4, the supported catalyst composition demonstrates good durability.

Inventive Example 3

PtNb Alloy & Nb Oxide on C

A supported Pt alloy catalyst composition was prepared in a similar manner to that of Inventive Example 1 except that here $NbO_x$ precursor was deposited on TC306® (Asbury) synthetic graphite using the sol-gel technique. The sample was heated as before in an argon atmosphere at 400° C. for 1 hour to produce an amorphous Nb oxide-carbon hybrid support. No crystalline phase was found in the XRD pattern obtained for this hybrid support.

Figure 4:
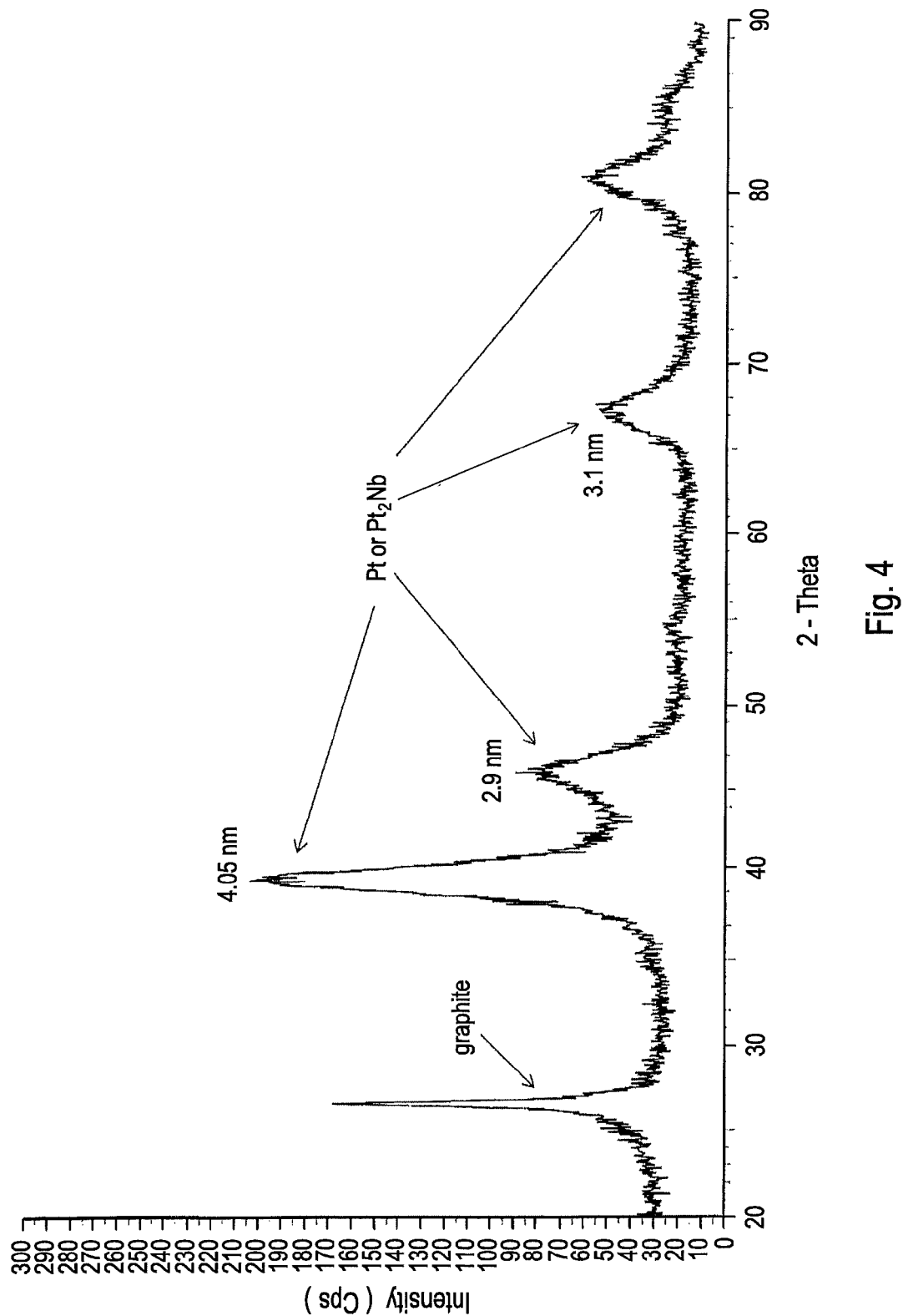
FIG. 4 shows an x-ray diffraction spectrum of the carbon supported catalyst composition of Inventive Example 3.

The Nb oxide-carbon hybrid support was then decorated with Pt and heated in a hydrogen atmosphere as before to produce another supported Pt alloy catalyst composition. An XRD pattern of this product is shown in FIG. 4. In this example, the graphite crystalline phase was observed. Otherwise though, once again the pattern was characterized by four detectable peaks attributable only to Pt or $Pt_2Nb$. The apparent size of the crystalline material in the composition was determined from the half-widths of the three peaks indicated in the pattern of FIG. 4 and range from 2.9 nm to about 4.05 nm.

The elemental makeup of the supported catalyst composition was again determined by EDX and the results are presented in Table 5 below.

TABLE 5

EDX results for Inventive Example 3

| Element and X-ray line | Average atomic % | σ | Average weight % | σ |
| --- | --- | --- | --- | --- |
| C K | 90.46 | 0.33 | 57.26 | 1.30 |
| O K | 4.58 | 0.26 | 3.86 | 0.24 |
| Nb L | 2.23 | 0.09 | 10.93 | 0.24 |
| Pt M | 2.72 | 0.17 | 27.95 | 1.19 |

Again, like in the previous example, while the presence of a PtNb intermetallic could not be confirmed from the XRD data, the compositional analysis suggests otherwise and particularly the presence of $Pt_2Nb$. Note that the atomic ratio of Nb/O is about 2, significantly less than 2.5.

The supported catalyst composition was then subjected to electrochemical testing. This time, only a modified SWC cycle test for 30,000 cycles was performed. Table 6 below summarizes the values of ECSA and $I_k$ measured.

TABLE 6

ECSA and $I_k$ results for Inventive Example 3

| Modified SWC cycle # | ECSA (normalized) | $I_k$ (normalized) |
| --- | --- | --- |
| 0 | 1 | 1 |
| 30000 | 0.855 | 1.01 |

As can be seen in the results of Table 6, the performance of the supported catalyst composition is maintained after 30,000 cycles in spite of a significant decrease in ECSA.

Inventive Example 4

PtNb Alloy & Nb Oxide on C

Another supported Pt alloy catalyst composition was made in a similar manner to that of Inventive Example 1 except that here $NbO_x$ precursor was deposited on 2299® Asbury natural graphite using the sol-gel technique. Once again, the sample was heated as before in an argon atmosphere at 400° C. for 1 hour to produce amorphous Nb oxide-carbon hybrid support. No crystalline phase was found in the XRD pattern obtained for this hybrid support.

Figure 5:
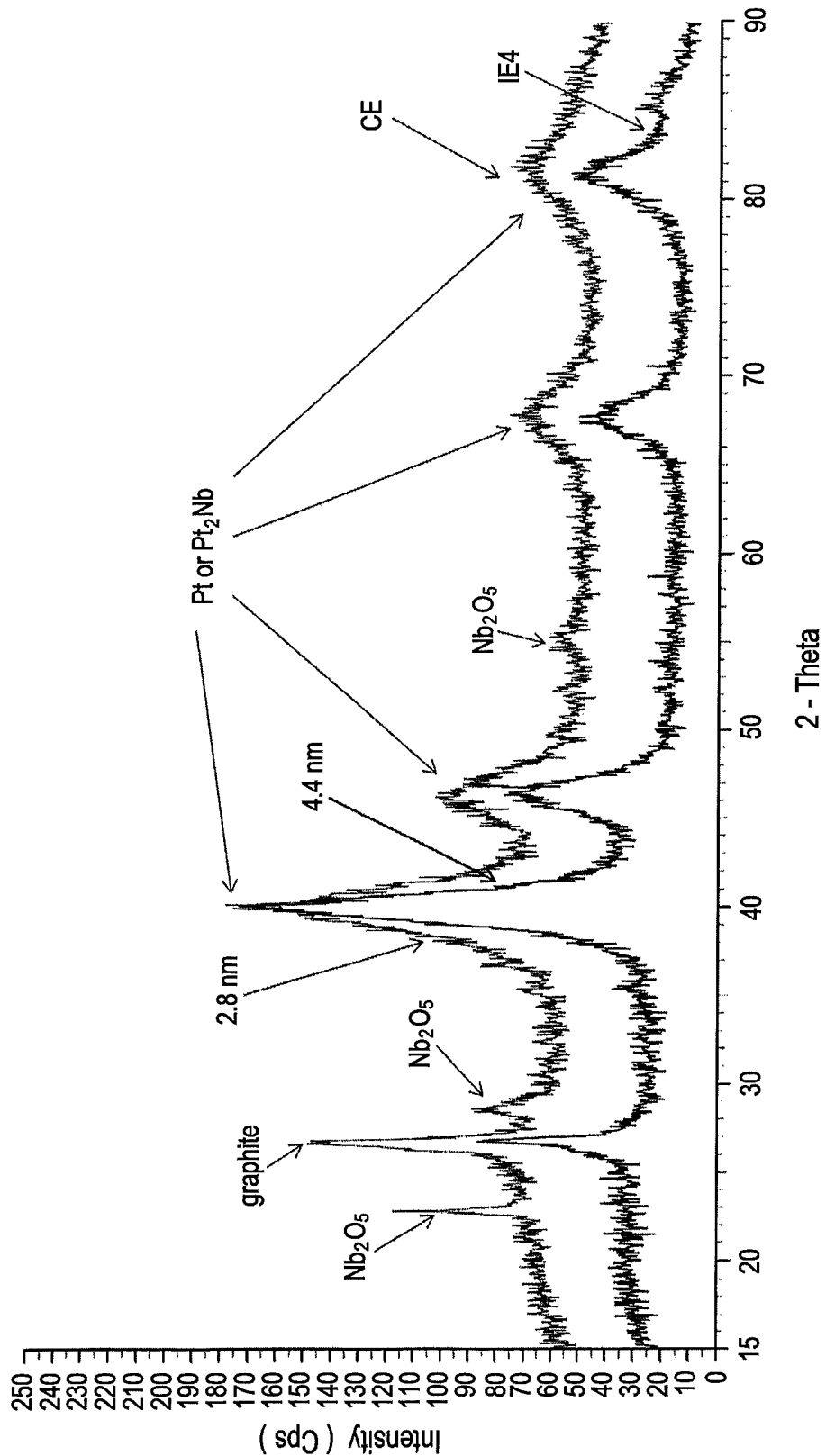
FIG. 5 compares the x-ray diffraction spectra of the carbon supported catalyst compositions of Inventive Example 4 and Comparative Example 1.

The Nb oxide-carbon hybrid support was then decorated with Pt and heated in a hydrogen atmosphere as before to produce supported Pt alloy catalyst compositions. An XRD pattern of this product is shown in FIG. 5 and is denoted as Inventive Example IE4.

Again, a graphite peak could be observed along with four detectable peaks attributable only to Pt or $Pt_2Nb$. The apparent size of the crystalline material in the composition as indicated on the peak shown in FIG. 5 was 4.4 nm.

The supported catalyst composition was then subjected to modified SWC cycle test for 30,000 cycles as in the previous example. Table 7 below summarizes the values of ECSA and $I_k$ measured.

TABLE 7

ECSA and $I_k$ results for Inventive Example 4

| Modified SWC cycle # | ECSA (normalized) | $I_k$ (normalized) |
| --- | --- | --- |
| 0 | 1 | 1 |
| 30000 | 0.914 | 1.19 |

As illustrated by Table 7, the performance of the supported catalyst composition is maintained after 30,000 cycles in spite of a decrease in ECSA.

Inventive Example 5

PtNb Alloy & Nb Oxide on C

In this Example, a supported Pt alloy catalyst composition was made using an alternative method to those in the previous examples. Here both $NbO_x$ and Pt precursors were deposited on OSAB® Denka acetylene black carbon simultaneously (in a 1:1 atomic ratio) using the sol-gel technique as in Inventive Example 1. The product obtained was then heated directly in a hydrogen atmosphere at 800° C. for 1 hour to produce the final supported Pt alloy catalyst composition. This modified procedure was adopted in an attempt to reduce the number of steps, to synthesize catalyst with a designed intermetallic composition, and to improve the dispersion thereof.

Figure 6:
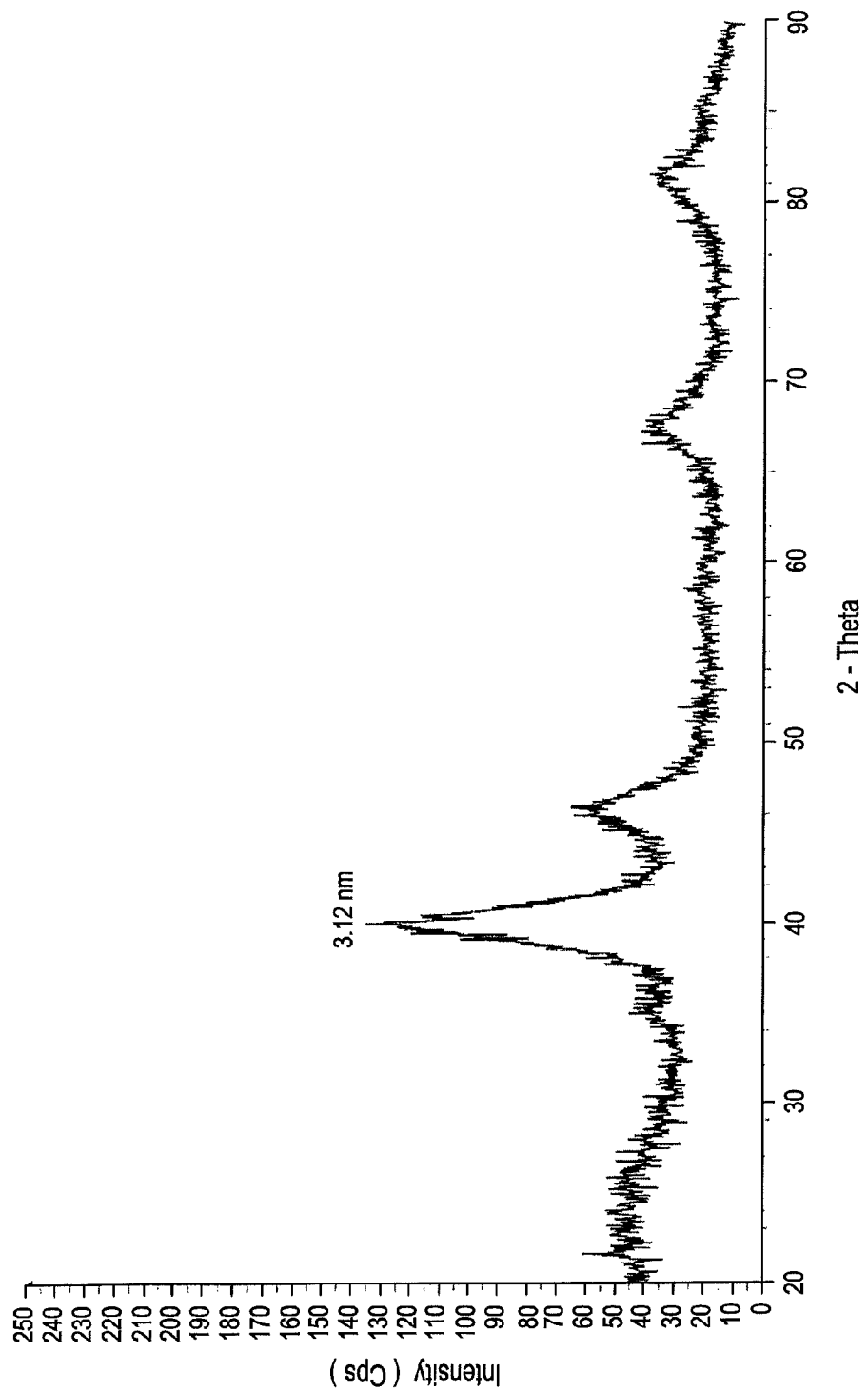
FIG. 6 shows an x-ray diffraction spectrum of the carbon supported catalyst composition of Inventive Example 5.

An XRD pattern of the supported catalyst composition is shown in FIG. 6. Here, only four detectable peaks were observed attributable to Pt or $Pt_2Nb$. The apparent size of the crystalline material in the composition as indicated on the peak shown in FIG. 6 was ~3 nm.

The supported catalyst composition was subjected to modified SWC cycle test as in the previous example. Here however, cycle testing continued well beyond 30,000 cycles (because there was an initial decrease seen in $I_k$ followed by a subsequent recovery). Table 8 below summarizes the values of ECSA and $I_k$ measured.

TABLE 8

ECSA and $I_k$ results for Inventive Example 5

| Modified SWC cycle # | ECSA (normalized) | $I_k$ (normalized) |
| --- | --- | --- |
| 0 | 1 | 1 |
| 30,000 | 0.81 | 0.84 |
| 50,000 | 0.87 | 1.17 |
| 80,000 | 0.76 | 1.11 |
| 110,000 | 0.62 | 0.98 |

Note:
the actual initial ECSA was between about 60 and 72 $m^2$/g Pt.

As illustrated by Table 8, although the performance of the supported catalyst composition appeared to decrease after 30,000 cycles, it recovered in subsequent cycling to be greater than it was originally.

Comparative Example 1

A supported catalyst composition comprising Pt and Nb was made in a like manner to that of Inventive Example 2 except that here the $NbO_x$ precursor was deposited on Darco G 60 and heated directly in an argon atmosphere to 800° C. for 1 hour. The resulting intermediate was then decorated with Pt precursor and heated at 400° C. thereafter in a hydrogen atmosphere to produce the final comparative supported catalyst composition.

An XRD pattern of this supported catalyst composition is denoted as Comparative Example CE1 and is shown in FIG. 5. The crystalline phases of $Nb_2O_5$ and graphite can be observed along with four peaks at similar locations as those for sample IE4. The average Pt crystallite size of 2.8 nm in the CE1 sample is indicated on the respective peak in FIG. 5. This spectrum compares a typical XRD pattern of a Pt post decorated "crystalline" hybrid support to that of a catalyst with Pt partially alloyed with Nb.

The initial mass activity was determined to be ~340 A/g Pt. Then, the supported catalyst composition was subjected to the regular SWC cycle test for 1000 cycles. Table 9 below summarizes the values of ECSA and $I_k$ measured.

TABLE 9

ECSA and $I_k$ results for Comparative Example 1

| Regular SWC cycle # | ECSA (normalized) | $I_k$ (normalized) |
|---|---|---|
| 0 | 1 | 1 |
| 1000 | 0.55 | 0.68 |

Note:
the actual initial ECSA was 67 m²/g Pt and the Pt loading was 11.2 μg/cm².

As is evident from Table 9, the durability of the comparative catalyst composition is inferior to that of the inventive compositions.

Inventive Example 6 (PtCoNb Alloy & Nb Oxide on C) and Comparative Examples 2 and 3

A supported PtCo alloy catalyst composition, denoted as Inventive Example IE6, was prepared in a similar manner to Inventive Example 1 by first depositing $NbO_x$ precursor onto a carbon support, heating, then depositing Pt and Co precursors on the $NbO_x$-carbon hybrid support, and heating again at 600° C. Specifically, a sol solution of $NbO_x$ was prepared using niobium ethoxide precursor in a mixture of 2-propanol with a strong acid as a catalyst. The $NbO_x$ was then deposited on Cabot® BP 2000 carbon black using a sol-gel technique. The sample was then heated in an argon atmosphere at 400° C. for 1 hour to produce amorphous $NbO_{2.5}$. X-ray diffraction (XRD) patterns of the sample was obtained at this point and showed no presence of a crystalline Nb oxide phase for hybrid supported catalyst. The amorphous $NbO_{2.5}$-carbon hybrid obtained was then decorated with Pt as before and afterwards heated in a hydrogen atmosphere at 800° C. for 1 hour to produce the final supported Pt alloy catalyst composition.

A supported catalyst composition comprising Pt, Co and Nb, denoted here as Comparative Example CE2, was made in a like manner to that of the above Inventive Example 6 except that here the $NbO_x$ precursor was deposited on BP 2000 carbon and heated directly in an argon atmosphere to 800° C. for 1 hour. The resulting intermediate was then decorated with Pt and Co precursors and heated at 400° C. thereafter in a hydrogen atmosphere to produce the final comparative supported catalyst composition.

A further Comparative Example CE3 was prepared by depositing Pt and Co precursors on BP 2000 carbon in a like manner to that of Comparative Example CE2 above and then heating at 400° C. thereafter in a hydrogen atmosphere to produce the final comparative supported catalyst composition.

Figure 7:
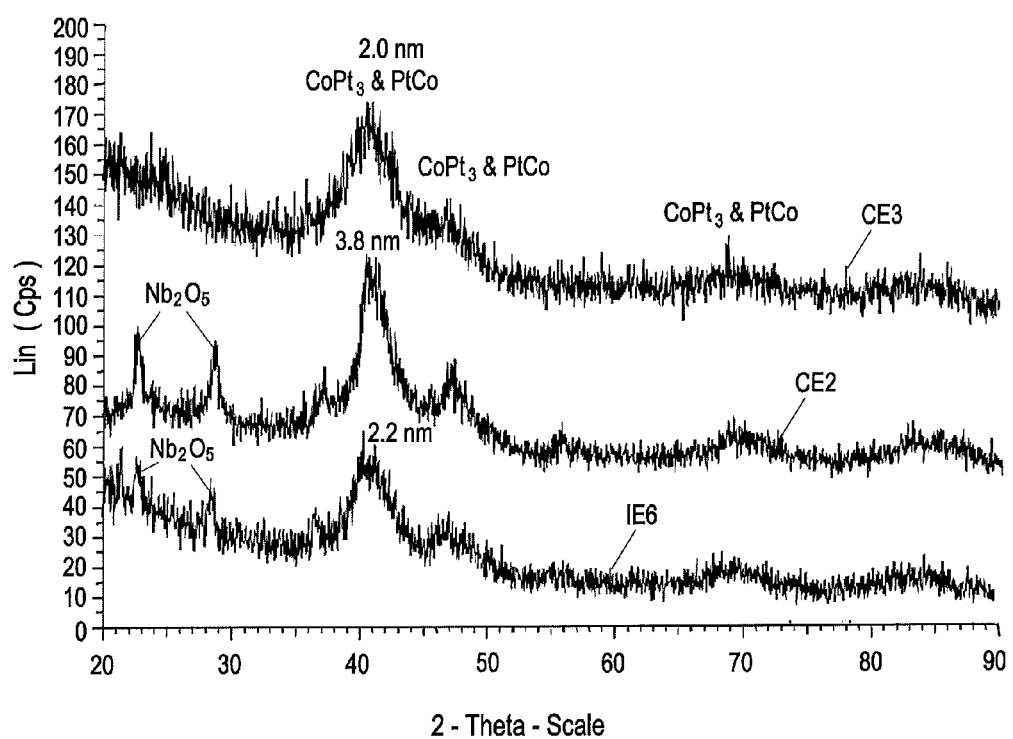
FIG. 7 compares x-ray diffraction spectrums of the carbon supported catalyst composition of Inventive Example 6 to those of Comparative Examples 2 and 3.

XRD patterns of the above samples were obtained and are shown in FIG. 7. As before, estimates were made of the apparent particle size based on the XRD patterns. The presence of crystalline $Nb_2O_5$ was detected in Comparative Example CE2. In Inventive Example, no crystalline niobium oxide was detected. In Comparative Example CE3, only a PtCo phase was detected because it did not contain any niobium oxide. In all the samples, two different PtCo phases are suggested: Pt3Co-cubic, and Pt/Co-tetragonal. Moreover, in Comparative Example CE2, the PtCo nanoclusters had higher values.

The supported catalyst compositions were then subjected to modified SWC cycle testing as above. Table 10 below summarizes the values of ECSA, $I_k$, mass activity, and Pt particle size which were determined for these three samples.

TABLE 10

ECSA, $I_k$, mass activity and particle size results for samples IE6, CE2, and CE3

| Sample | Modified SWC cycle # | ECSA (normalized) | $I_k$ (normalized) | Initial mass activity (A/g Pt) | Pt particle size (nm) |
|---|---|---|---|---|---|
|  | 0 | 1 | 1 |  |  |
| IE6 | 30,000 | 0.75 | 0.72 | 565 ± 8 | 2.2 |
| CE2 | 30,000 | 0.61 | 0.64 | 426 ± 48.6 | 3.8 |
| CE3 | 30,000 | 0.61 | 0.62 | 492 ± 47.7 | 2.1 |

Conventional PtCo catalysts are less durable than Pt catalysts as a result of Co leaching out in the acidic environment of such fuel cells. The degradation of commercially available PtCo catalysts averages about 60% in performance in certain ex-situ accelerated tests. These examples demonstrate the improved durability and initial mass activity of the inventive carbon supported catalyst compositions when compared to the comparative examples.

Inventive Example 7 (PtNb alloy & Nb Oxide on C) and Comparative Example 4

A supported catalyst composition comprising Pt and Nb, denoted here as Inventive Example IE7, was made in a like manner to that of Inventive Example 5. Here however both $NbO_x$ and Pt precursors were simultaneously deposited on BP 2000 black carbon support (in a different 1:3 atomic ratio).

Figure 8:
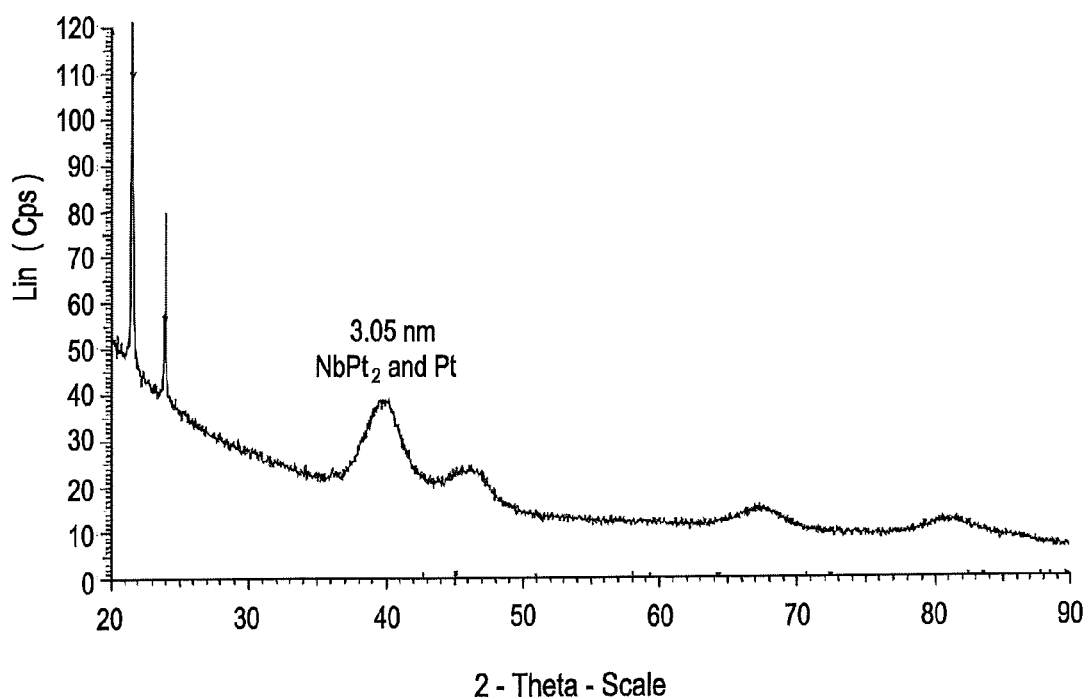
FIG. 8 shows an x-ray diffraction spectrum of the carbon supported catalyst composition of Inventive Example 7.

An XRD pattern of this sample was obtained and is shown in FIG. 8. The presence of crystalline $Nb_2O_5$ was not detected as in certain previous Inventive Examples when Pt was deposited on carbon supported amorphous niobium oxide.

The catalyst was then subjected to modified SWC cycle testing as in the previous examples. Table 11 below summarizes the values of ECSA, $I_k$, mass activity, and Pt particle size which were determined for this sample.

TABLE 11

ECSA, $I_k$, mass activity and particle size results for sample IE7

| Modified SWC cycle # | ECSA (normalized) | $I_k$ (normalized) | Initial mass activity (A/g Pt) | Pt particle size (nm) |
|---|---|---|---|---|
| 0 | 1 | 1 | | |
| 30,000 | 0.864 | 0.904 | 491 ± 73 | 3 |

A comparative carbon supported catalyst composition, denoted here as Comparative Example CE4, was prepared by depositing Pt on a carbon supported crystalline niobium oxide (namely a support comprising BP2000 carbon black upon which $NbO_x$ precursor was deposited and then heated directly in an argon atmosphere to 800° C. for 1 hour), followed by heating at 400° C. in an argon atmosphere.

Laboratory scale MEAs (electrode areas of 5 cm²) were made using either supported catalyst composition IE7 or CE4 as the cathode catalyst. Otherwise, each MEA was of the same conventional construction (i.e. perfluorosulfonated ionomer electrolyte, carbon supported Pt anode catalyst, carbon based gas diffusion layers) and both were subjected to an accelerated stress testing (AST) regime designed to accelerate the dissolution of Pt. Specifically this involved providing the fuel cells with hydrogen and air reactants at 1 L/min and 2 L/min respectively and both at 100% RH and essentially ambient pressure, and cycling for 5000 cycles at 0.1 V for 2 sec and at 1.0 V for 2 sec at 65° C.

Figure 9:
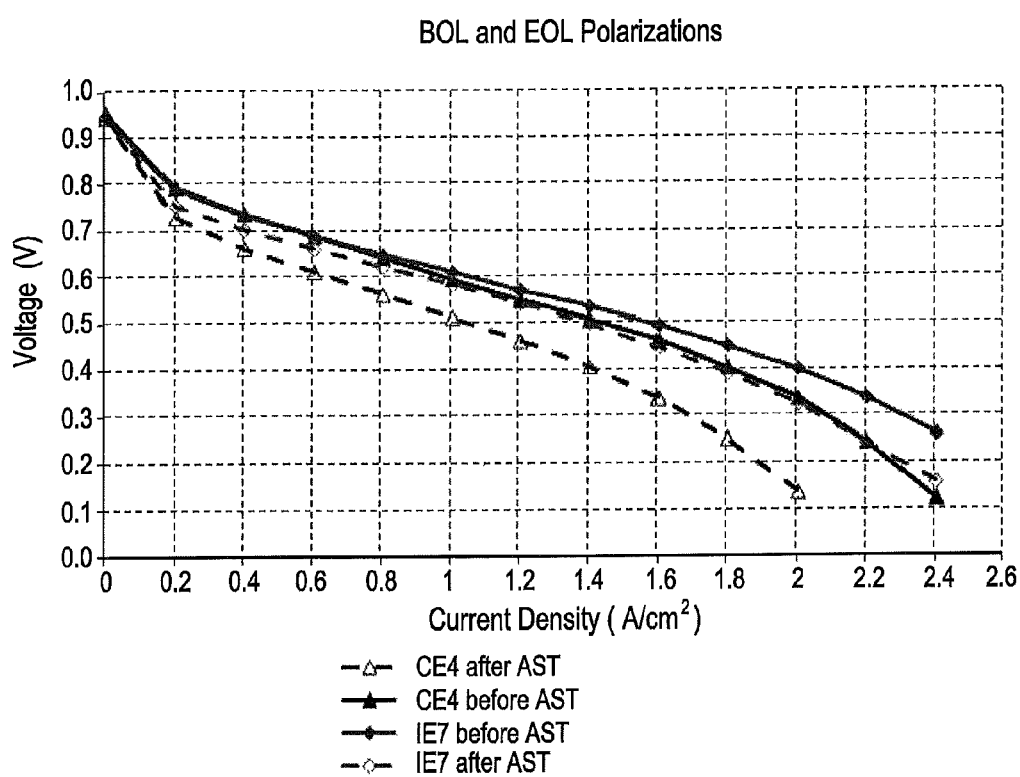
FIG. 9 compares polarization plots, both before and after accelerated stress testing, for test fuel cells made with either the Inventive Example 7 carbon supported catalyst composition or the Comparative Example 4 composition.

FIG. 9 shows the polarization plots (voltage versus current density) for both cells before AST, and after AST. Both fuel cells show about the same initial performance in the kinetic region (i.e. ~0.1 A/cm²) but the cell comprising the inventive supported catalyst composition IE7 shows better performance than the comparative CE4 cell at higher current densities (i.e. >1.0 A/cm²). Further the IE7 cell performed substantially better than the CE4 after the accelerated stress testing and hence showed substantially higher durability.

Inventive Example 8

PtV Alloy & V Oxide on C

A supported catalyst composition comprising Pt and V, denoted here as Inventive Example IE8, was made in a like manner to that of Inventive Example 5. Here however both $VO_x$ and Pt precursors were simultaneously deposited on BP 2000 black carbon support (in a 1:3 atomic ratio).

Figure 10:
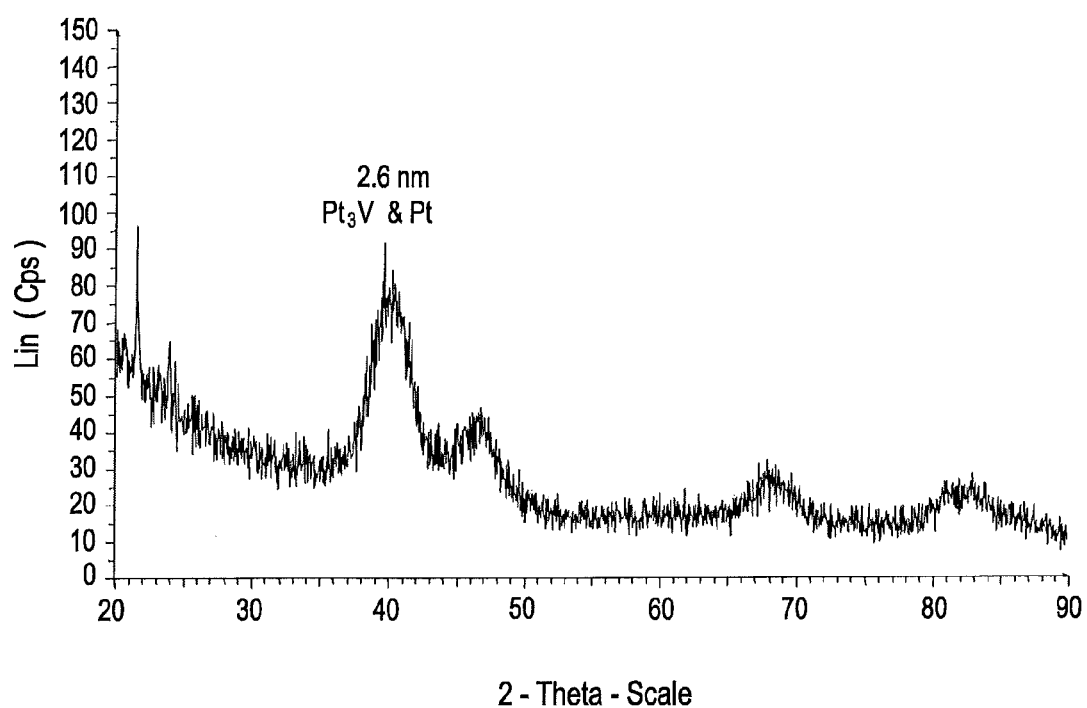
FIG. 10 shows an x-ray diffraction spectrum of the carbon supported catalyst composition of Inventive Example 8.

An XRD pattern of this sample was obtained and is shown in FIG. 10. The presence of crystalline vanadium oxide was not detected. The presence of $Pt_3V$ tetragonal phase is suggested.

The catalyst was then subjected to modified SWC cycle testing as in the previous examples. Table 12 below summarizes the values of ECSA, $I_k$, mass activity, and Pt particle size which were determined for this sample.

TABLE 12

ECSA, $I_k$, mass activity and particle size results for sample IE8

| Modified SWC cycle # | ECSA (normalized) | $I_k$ (normalized) | Initial mass activity (A/g Pt) | Pt particle size (nm) |
|---|---|---|---|---|
| 0 | 1 | 1 | | |
| 30,000 | 0.75 | 0.84 | 406 | 2.6 |

Inventive Example 9

PtMo Alloy & Mo Oxide on C

A supported catalyst composition comprising Pt and Mo, denoted here as Inventive Example IE9, was made in a like manner to that of Inventive Example 5. Here however both $MoO_x$ and Pt precursors were simultaneously deposited on BP 2000 black carbon support (in a 1:2 atomic ratio).

Figure 11:
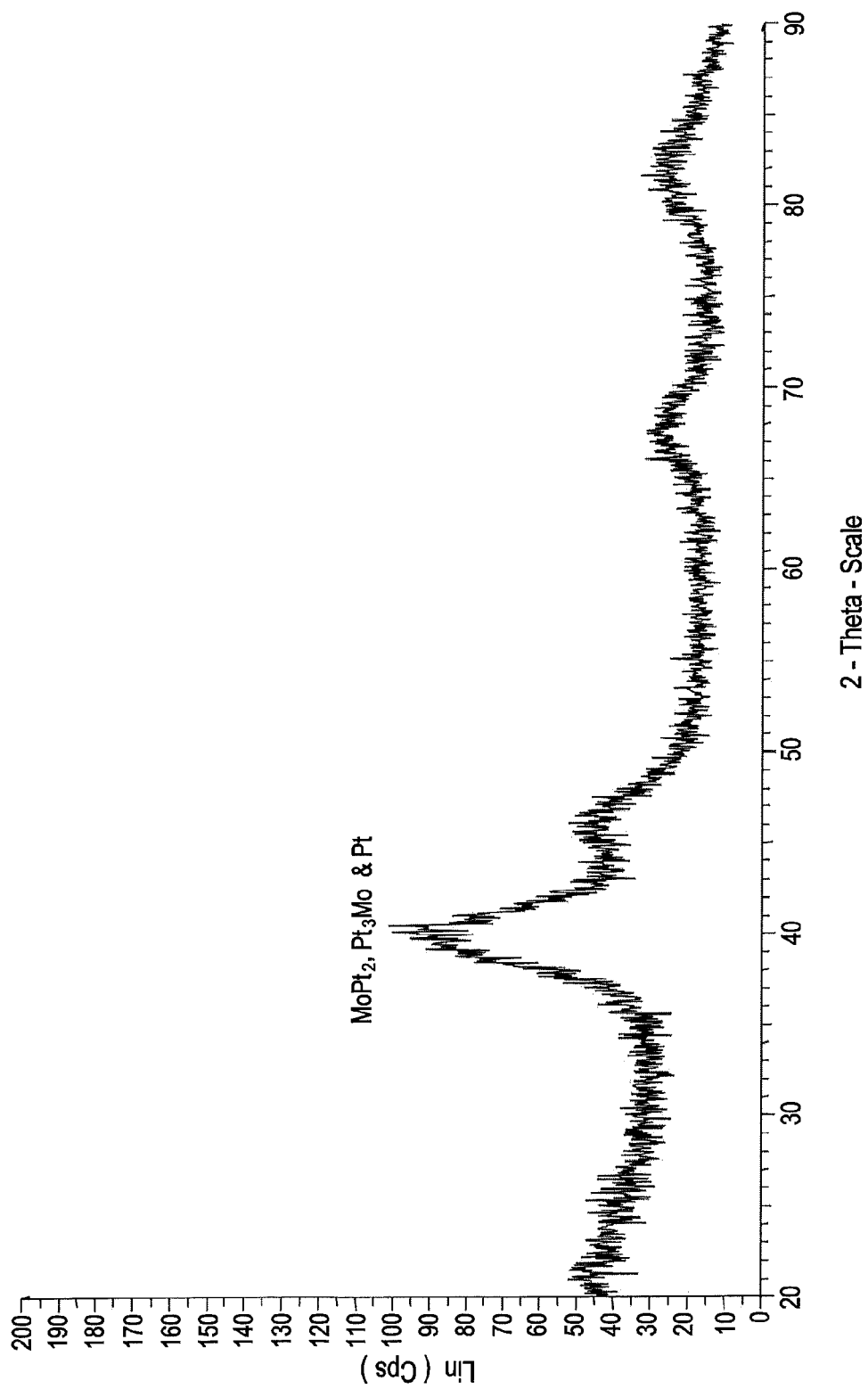
FIG. 11 shows an x-ray diffraction spectrum of the carbon supported catalyst composition of Inventive Example 9.

An XRD pattern of this sample was obtained and is shown in FIG. 11. The presence of crystalline molybdenum oxide was not detected. Two intermetallic phases, tetragonal $Pt_3Mo$ and orthorhombic $Pt_2Mo$, were suggested.

The catalyst was then subjected to modified SWC cycle testing as in the previous examples. Table 13 below summarizes the values of ECSA, $I_k$, mass activity, and Pt particle size which were determined for this sample.

TABLE 13

ECSA, $I_k$, mass activity and particle size results for sample IE9

| Modified SWC cycle # | ECSA (normalized) | $I_k$ (normalized) | Initial mass activity (A/g Pt) | Pt particle size (nm) |
|---|---|---|---|---|
| 0 | 1 | 1 | | |
| 30,000 | 0.83 (NA) | 0.77 | 520 ± 95 | 2.4 |

Inventive Example 10

PtTa Alloy & Ta Oxide on C

A supported catalyst composition comprising Pt and Ta, denoted here as Inventive Example IE10, was made in a like manner to that of Inventive Example 5. Here, both Ta (as in tantalum ethoxide) and Pt precursors were simultaneously deposited on BP 2000 black carbon support (in a 1:3 atomic ratio).

Figure 12:
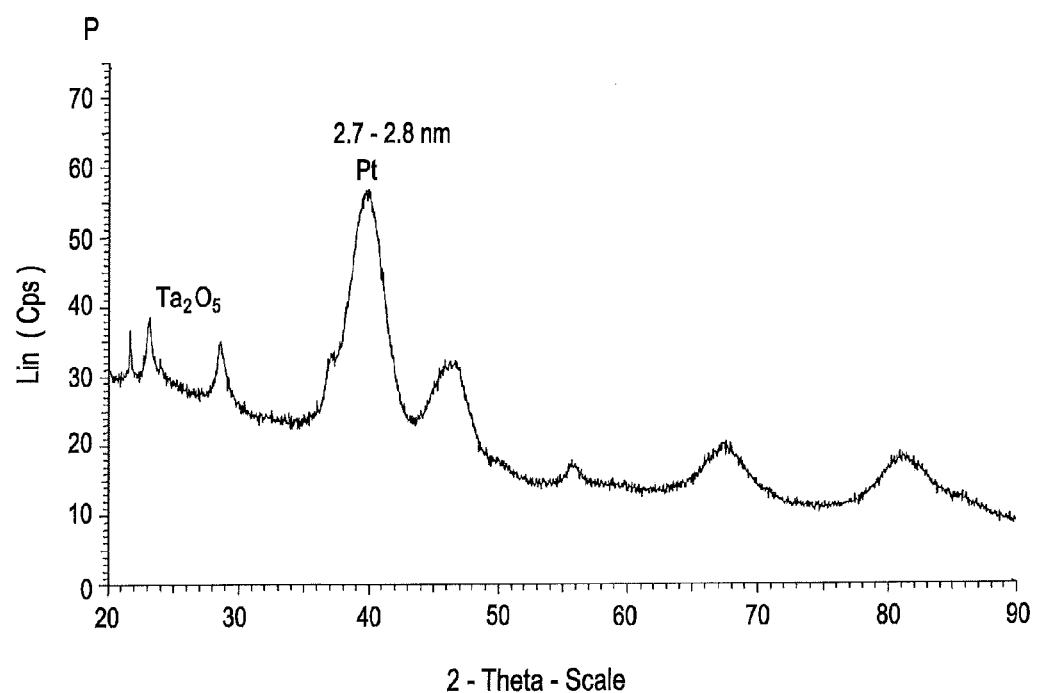
FIG. 12 shows an x-ray diffraction spectrum of the carbon supported catalyst composition of Inventive Example 10.

An XRD pattern of this sample was obtained and is shown in FIG. 12. Interestingly, the presence of crystalline tantalum oxide was detected here.

The catalyst was then subjected to modified SWC cycle testing as in the previous examples. Table 14 below summarizes the values of ECSA, $I_k$, mass activity, and Pt particle size which were determined for this sample.

TABLE 14

ECSA, $I_k$, mass activity and particle size results for sample IE10

| Modified SWC cycle # | ECSA (normalized) | $I_k$ (normalized) | Initial mass activity (A/g Pt) | Pt particle size (nm) |
|---|---|---|---|---|
| 0 | 1 | 1 | | |
| 30,000 | 0.816 | 0.81 | 423 ± 64 | 2.8 |

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Therefore, such modifications are to be considered within the purview and scope of the claims appended hereto.

What is claimed is:

1. A carbon supported catalyst composition comprising a catalyst composition finely dispersed on a carbon containing support wherein the catalyst composition comprises PtCoNb alloy and $Nb_2O_5$.

2. The carbon supported catalyst composition of claim 1 wherein the carbon in the carbon containing support is a carbon black, acetylene black, activated charcoal, synthetic graphite, or natural graphite.

3. An electrode for a fuel cell comprising the carbon supported catalyst composition of claim 1.

4. A fuel cell comprising the carbon supported catalyst composition of claim 1.

* * * * *